(12) United States Patent
Gallet

(10) Patent No.: US 9,482,104 B2
(45) Date of Patent: Nov. 1, 2016

(54) HIGH-PRESSURE TURBINE BLADES MADE OF CERAMIC MATRIX COMPOSITES

(71) Applicant: SNECMA, Paris (FR)

(72) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 453 days.

(21) Appl. No.: 14/059,968

(22) Filed: Oct. 22, 2013

(65) Prior Publication Data

US 2014/0119939 A1 May 1, 2014

(30) Foreign Application Priority Data

Oct. 22, 2012 (FR) ...................................... 12 60045

(51) Int. Cl.
*F01D 5/30* (2006.01)
*F01D 5/28* (2006.01)
*B29D 99/00* (2010.01)

(52) U.S. Cl.
CPC ........... *F01D 5/284* (2013.01); *B29D 99/0028* (2013.01); *F01D 5/3053* (2013.01); *F05D 2300/6033* (2013.01); *Y02T 50/672* (2013.01)

(58) Field of Classification Search
CPC .......... F01D 5/3053; F01D 5/12; F01D 5/14; F01D 5/141; F01D 5/147
USPC .................. 416/229 R, 230, 229 A
See application file for complete search history.

(56) References Cited

U.S. PATENT DOCUMENTS

| | | | | | |
|---|---|---|---|---|---|
| 2,958,505 | A | * | 11/1960 | Frank ...................... | B21D 53/78 29/889.72 |
| 4,037,990 | A | * | 7/1977 | Harris ................... | F01D 5/3053 416/135 |
| 5,292,231 | A | * | 3/1994 | Lauzeille ................ | F01D 5/282 416/229 A |
| 2005/0076504 | A1 | * | 4/2005 | Morrison ................ | F01D 5/282 29/889.72 |
| 2007/0128041 | A1 | | 6/2007 | Ahmad et al. | |
| 2010/0284816 | A1 | | 11/2010 | Propheter-Hinckley et al. | |
| 2011/0206522 | A1 | * | 8/2011 | Alvanos .................. | F01D 5/282 416/204 R |
| 2012/0055609 | A1 | | 3/2012 | Blanchard et al. | |
| 2012/0301306 | A1 | | 11/2012 | Alvanos et al. | |
| 2012/0301314 | A1 | | 11/2012 | Alvanos et al. | |

FOREIGN PATENT DOCUMENTS

| | | |
|---|---|---|
| EP | 1 525 942 A1 | 4/2005 |
| EP | 1 884 623 A2 | 2/2008 |
| EP | 1 930 548 A2 | 6/2008 |
| EP | 2 077 376 A2 | 7/2009 |
| EP | 2 363 574 A2 | 9/2011 |
| FR | 2 943 942 A1 | 10/2010 |
| GB | 757502 A | 9/1956 |
| GB | 1 262 608 A | 2/1972 |
| GB | 1 268 911 A | 3/1972 |

OTHER PUBLICATIONS

French Preliminary Search Report issued Mar. 19, 2013, in French Application No. 12 60045 filed Oct. 22, 2012 (with English Translation of Categories of Cited Documents).

* cited by examiner

*Primary Examiner* — Richard Edgar
(74) *Attorney, Agent, or Firm* — Oblon, McClelland, Maier & Neustadt, L.L.P.

(57) ABSTRACT

A turbine blade for a turbojet engine, made of a ceramic matrix composite material and including a vane that extends above a platform and a root that extends below the platform is provided. The pressure face and the suction face of the vane is formed by sheets of a composite material, the sheets meeting at the leading edge and trailing edge of the vane. The pressure face and suction face are formed by the same sheet bent back on itself, in a radial direction, at the leading edge or trailing edge.

12 Claims, 2 Drawing Sheets

HIGH-PRESSURE TURBINE BLADES MADE OF CERAMIC MATRIX COMPOSITES

BACKGROUND OF THE INVENTION

1. Field of the Invention

The field of the present invention is that of turbine engines and, more particularly, that of producing the high-pressure turbine blades for these turbine engines.

2. Description of the Related Art

A turbine engine for an aircraft generally comprises, from upstream to downstream in the direction of gas flow, a fan, one or more compressor stages, such as a low-pressure compressor and a high-pressure compressor, a combustion chamber, one or more turbine stages, such as a high-pressure turbine and a low-pressure turbine, and a gas exhaust pipe. A turbine may be associated with each compressor, the two being connected by a shaft, thereby forming, for example, a high-pressure (HP) core and a low-pressure (LP) core.

The turbine blades are parts that are subjected to very high temperatures and high mechanical stresses due to the centrifugal force acting thereon. In particular, the performance of modern engines dictates that the temperature to which the high-pressure turbine blades are subjected be as high as possible. For this reason, these blades are typically made of a metal material, but it would be beneficial for these blades to be made of a composite material and, in particular, a ceramic matrix composite (CMC). In fact, the advantage of CMC parts is their low density and their excellent temperature resistance. Their main shortcoming, conversely, is that they are less resistant to stresses and have a propensity to delustre; this makes it difficult to use them for turbine blades.

Work was first carried out to use this material in designing LP turbine blades, as in patent application FR2943942 filed by the applicant, since such blades are subjected to comparatively lower temperatures. However, it would be beneficial to also use this technology for HP turbine blades. This would thus make it possible to limit the mass of the blades and, in turn, that of the discs supporting said blades, and to reduce the ventilation flow rate and/or to increase the service life of these blades and discs.

In addition, European patent application EP 2077376 is known, which describes a hollow turbine engine blade of which both the vane and the root are made of composite material. This document describes how the root of the blade is formed and the shape assigned thereto; it does not describe how the vane of the blade is produced, apart from specifying that it is made of composite material. In particular, it is not indicated how the sheet used to produce this vane is oriented. EP 2363574 is also known, which describes a full blade, the vane of which is composed of fibres having a substantially radial orientation.

One problem encountered when adapting CMC technology for the production of HP turbine blades is the small size of the blades and the high cooling flow rate passing therethrough. It is thus difficult to produce said blades from composite material while leaving an internal cavity.

BRIEF SUMMARY OF THE INVENTION

The aim of the present invention is to propose a technique for producing hollow high-pressure turbine blades in a ceramic matrix composite material.

Therefore, the invention relates to a turbine blade which is intended for a turbojet engine, made of a ceramic matrix composite material and comprises a vane that extends above a platform and a root that extends below said platform, the pressure face and suction face of said vane being formed by sheets of a composite material, said sheets meeting at the leading edge and trailing edge of said vane, characterised in that the pressure face and the suction face are formed by the same sheet bent back on itself, in a radial direction, at the leading edge or trailing edge.

Since the thickness of a HP turbine blade varies considerably, it is in fact easier for it to be produced by forming two thin sheets of constant thickness, separating them at their centre to form a cavity and making them meet at their leading and trailing edges, as opposed to making a single thick sheet made of composite material, the thickness of which would vary. The production of a hollow blade made of composite material by bending its sheet at the leading (or trailing) edge is very simple and is facilitated, particularly for high-pressure turbine blades, by the fact that the sheet is fairly thin with regard to its curvature.

In a first embodiment, the two portions of the sheet are contiguous and fixed to one another over the entire length of the vane.

In another embodiment, the two portions of the sheet are separate, forming a cavity for ventilation air to circulate.

Advantageously, the two portions of the sheet are joined at the trailing edge, respectively at the leading edge, by soldering.

Alternatively, the sheets are joined at the trailing edge, respectively at the leading edge, by embedment in the same ceramic matrix.

In a preferred embodiment, said sheet is bent back at the leading edge and joined to itself at the trailing edge.

Advantageously, the platform and/or the root are formed by an extension of the sheets composing the vane, the two portions of the sheet being contiguous and fixed to one another over the entire length of said platform and/or said root.

The invention also relates to a turbine engine comprising a wheel of high-pressure turbine blades as described above.

BRIEF DESCRIPTION OF THE SEVERAL VIEWS OF THE DRAWINGS

The invention will be better understood, and other aims, details, features and advantages thereof will emerge more clearly, over the course of the detailed explanatory description to follow of an embodiment of the invention given by way of a merely illustrative and non-limiting example, with reference to the accompanying schematic drawings, in which.

DETAILED DESCRIPTION OF THE INVENTION

Figure 1:
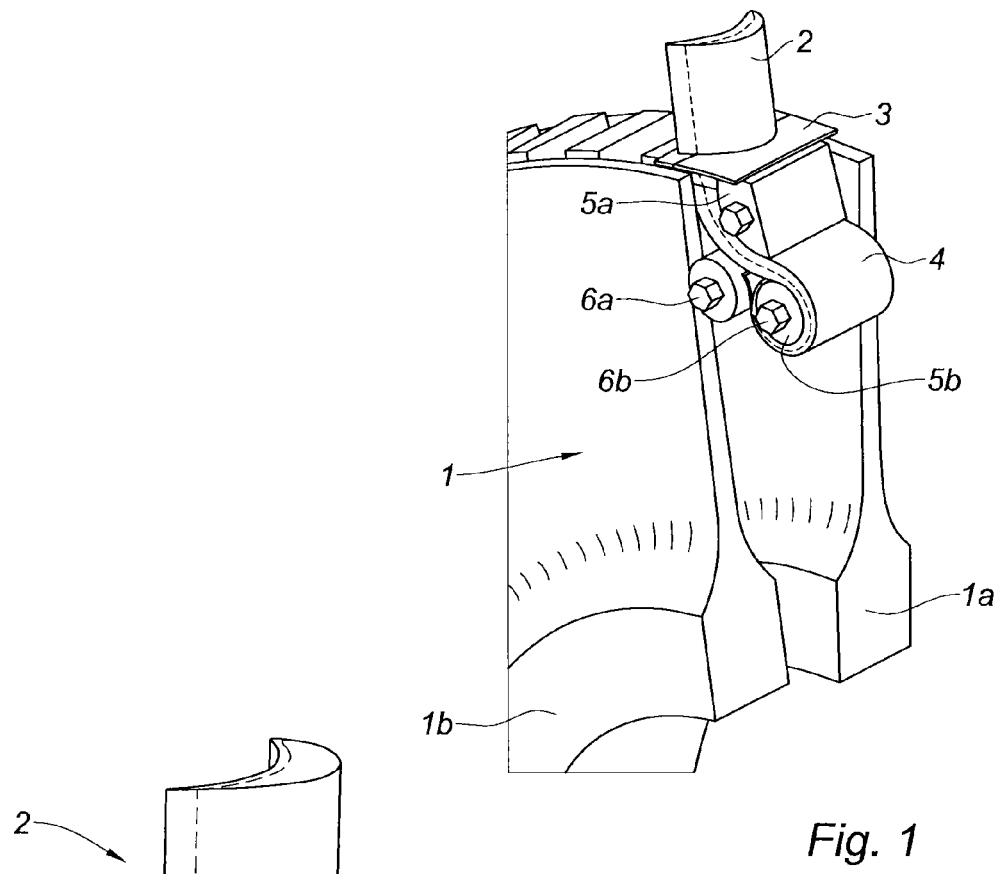
FIG. 1 is a perspective view of a HP turbine blade according to an embodiment of the invention, positioned on a turbine disc.
Figure 3:
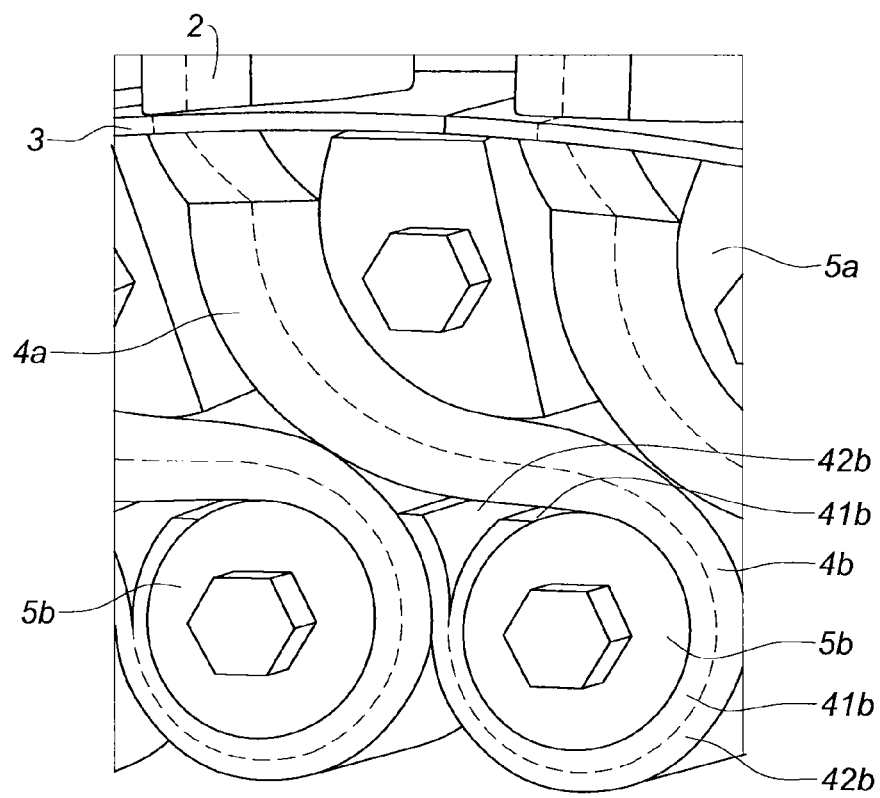
FIG. 3 shows a detail of the attachment of the blade in FIG. 1, in a first alternative embodiment.
Figure 4:
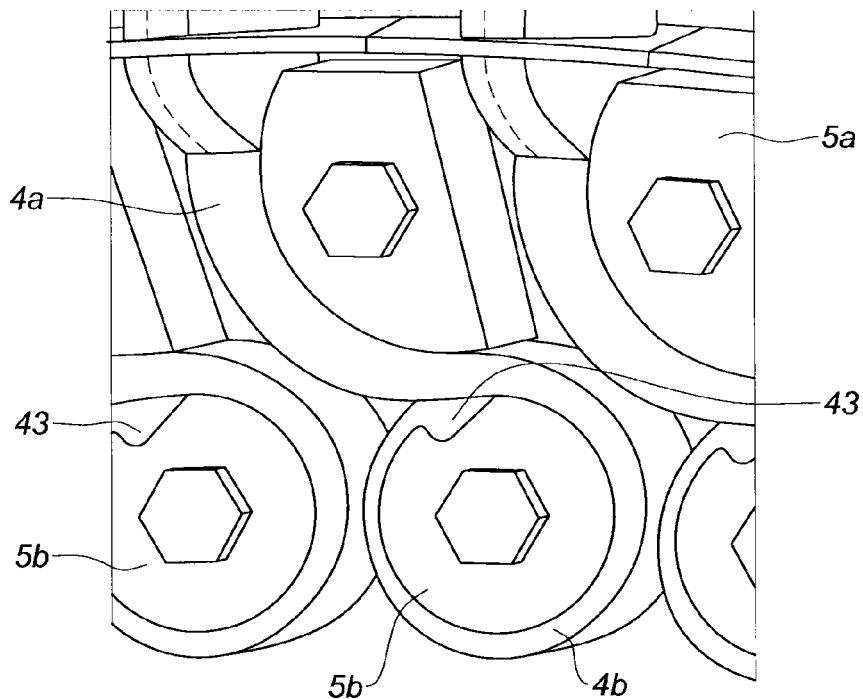
FIG. 4 shows a detail of the attachment of the blade in FIG. 1, in a second alternative embodiment.

Referring to FIG. 1, this shows a double turbine disc 1 (composed of two half discs: 1a placed upstream and 1b placed downstream) on which HP turbine blades are arranged circumferentially (only one of which is shown for the sake of the clarity of the drawing). This blade comprises one vane 2 having a base that is extended by a platform 3 resting on the external segment of the two half discs 1a and 1b. Said blade also comprises a root 4 that extends below said platform 3 and is wound around two supports: an upper support 5a below which the upper portion of the root 4 passes and a lower support 5b which is surrounded by the lower portion of the root 4. These two supports are cylindrical, although this shape is not imperative, thereby facilitating the transmission of forces from the blade to said supports. On their upstream and downstream faces (with reference to the direction in which the gas stream circulates within the vein of the turbine engine), the supports 5a and 5b have, respectively, axial extensions 6a and 6b designed for insertion in housings provided for this purpose in the internal lateral walls of the half discs 1a and 1b and thus for the transmission to these half discs of the forces for retaining the blades. These extensions are shown in FIGS. 3 and 4 with a hexagonal cross section, although this shape is not imperative, thus torsionally locking the support and preventing it from turning on itself once inserted in its housing.

Figure 2:
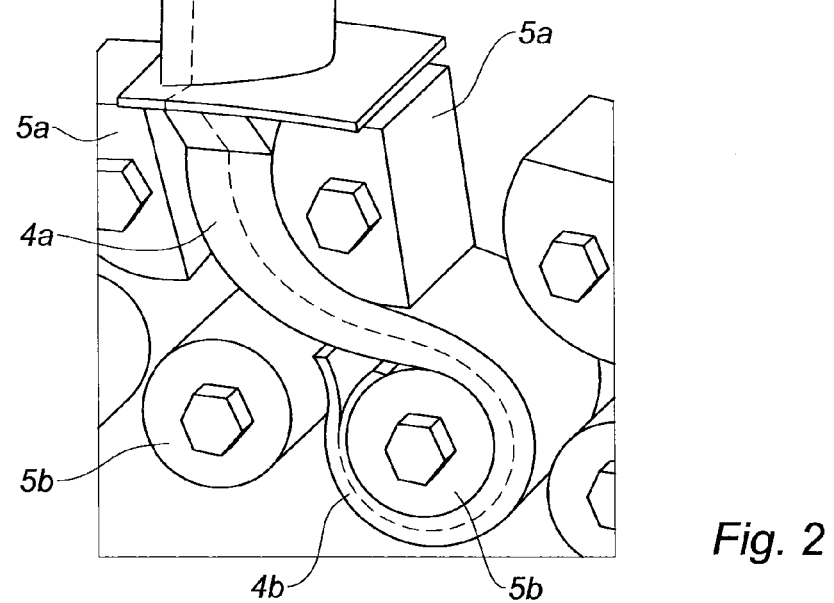
FIG. 2 is a detailed view of the turbine blade in FIG. 1 and of its device for attachment to the disc.

FIG. 2 shows the positioning of the HP blade and its retention by the corresponding supports 5a and 5b. The upper support 5a is shaped in the manner of a section of a cylinder, cut parallel to its generators to reduce the circumferential amplitude thereof and maintain only the portion thereof that cooperates with the upper portion 4a of the root 4. The lower support 5b is shaped in the manner of a full cylinder and is surrounded by the lower portion 4b of the root 4.

The blade—whether at the vane 2, the platform 3 or the root 4—is formed in two portions which are joined to one another by a method that will be explained hereinafter. The front portions of the vane, the platform and the root, that is those portions located on the side of the pressure face of the blade, are made of a ceramic matrix composite material; the same is true of the rear portions of the vane, the platform and the root, that is those portions located on the side of the suction face of the blade. Each of these portions is produced by the same fibrous sheet which is embedded in a ceramic matrix. As shown, the two portions are positioned parallel to one another and meet at the leading edge and trailing edge of the vane 2. The portions composing the platform 3 and the root 4 meet in a similar manner, as a continuation of the joint between the two portions composing the vane 2.

The two sheets, which form the front and rear portions, are joined to form the HP blade either by welding at the leading and trailing edges of the blade or by joint production by embedding the two sheets in the same ceramic matrix during production of the CMC. In the (frequent) case in which the blade is cooled, the two portions comprising the vane 2 are not contiguous over their entire surface; they thus meet only at their lateral ends, thereby forming the leading edge and the trailing edge and leaving a ventilating duct between them for cooling the blade.

In an alternative embodiment (not shown), the blade is hollow and produced using a single sheet, which is bent back at the leading edge and closes in on itself at the trailing edge, at the point where the two ends of the sheet are joined. The joint is ensured as previously indicated, either by soldering or by embedment in the same ceramic matrix.

FIGS. 3 and 4 show two alternative embodiments of the lower portion of the root 4 of a HP blade made of CMC and of the end thereof, with the aim of preventing the root from rotating about the lower support 5b. In a first variant, shown in FIG. 3, the lower portion 4b of the root is wound around the lower support 5b before splitting along the joining line of the two fibrous sheets composing the composite material. The first sheet 41b, which is that in contact with the lower support, maintains its cylindrical shape as it terminates and remains in contact with the support 5b, whereas the second sheet 42b has a line of inflection at the plane connecting the axis of symmetry of the lower support to that of the adjacent support, and is wound from this plane onto the adjacent lower support 5b. The V-shape of the two fibrous sheets prevents the root 4 of the HP blade from rotating and keeps the vane 2 thereof in a radial position within the gas vein.

In the variant shown in FIG. 4, the two fibrous sheets are joined to one another as far as the end of the root 4. By contrast, this single sheet 4b has a hook-shaped protrusion 43 which is positioned in a groove-shaped housing which is cut out for this purpose in the external surface of the lower cylindrical support 5b. By cooperating with the groove, the hook torsionally locks the lower end 4b of the root 4 with respect to the lower support 5b, thereby ensuring that the vane 2 of the HP blade keeps its radial position within the gas vein.

The invention claimed is:

1. A turbine blade for a turbojet engine, made of a ceramic matrix composite material and comprising a vane that extends above a platform and a root that extends below said platform, a pressure face and a suction face of said vane being formed by a sheet of a composite material,
    wherein the pressure face and the suction face are formed by the sheet bent back on itself, in a radial direction, at one of a leading edge or a trailing edge, and free ends of the sheet are joined together at the other of the leading edge or the trailing edge, and
    wherein the root includes an upper portion which is configured to be wound around an upper support on a turbine disc and a lower portion which is configured to be wound around a lower support on the turbine disc.

2. The blade according to claim 1, wherein two portions of the sheet are contiguous and fixed to one another over the entire length of the vane.

3. The blade according to claim 1, wherein two portions of the sheet are separate, forming a cavity for ventilation air to circulate.

4. The blade according to claim 1, wherein two portions of the sheet are joined at the trailing edge or at the leading edge by soldering.

5. The blade according to claim 1, wherein two portions of the sheet are joined at the trailing edge or at the leading edge by embedment in a ceramic matrix.

6. The blade according to claim 1, wherein said sheet is bent back at the leading edge and joined to itself at the trailing edge.

7. The blade according to claim 1, wherein at least one of the platform and the root is formed by an extension of the sheet composing the vane, two portions of the sheet being contiguous and fixed to one another over the entire length of said at least one of the platform and the root.

8. An engine comprising a wheel of high-pressure turbine blades according to any of the preceding claims.

9. The blade according to claim 1, wherein the pressure face and the suction face delimit a hollow ventilating duct.

10. The blade according to claim 1, wherein a free end of the lower portion of the root including an anti-rotation system which prevents rotation of the root about the lower support.

11. The blade according to claim 10, wherein the anti-rotation system includes the free end of the lower portion being split into first and second sections.

12. The blade according to claim 10, wherein the anti-rotation system includes a hook-shaped protrusion.

* * * * *